US012748487B1

(12) United States Patent
Drennan

(10) Patent No.: US 12,748,487 B1
(45) Date of Patent: Sep. 29, 2026

(54) SYSTEMS AND METHODS TO PREDICT VISEMES BASED ON TEXT DATA AND AUDIO FRAMES TO FACILITATE DISPLAY OF ANIMATIONS

(71) Applicant: Telo Holdings, Inc., Dana Point, CA (US)

(72) Inventor: Timothy James Drennan, Vail, CO (US)

(73) Assignee: Telo Holdings, Inc., Dana Point, CA (US)

( * ) Notice: Subject to any disclaimer, the term of this patent is extended or adjusted under 35 U.S.C. 154(b) by 0 days.

(21) Appl. No.: 19/535,486

(22) Filed: Feb. 10, 2026

(51) Int. Cl.

| | |
|---|---|
| ***G06F 3/01*** | (2006.01) |
| ***G06F 40/284*** | (2020.01) |
| ***G06T 13/20*** | (2011.01) |
| ***H04L 67/02*** | (2022.01) |

(52) U.S. Cl.
CPC ............ *G06F 3/011* (2013.01); *G06F 40/284* (2020.01); *G06T 13/205* (2013.01); *H04L 67/02* (2013.01); *G06F 2203/011* (2013.01)

(58) Field of Classification Search
CPC .. G06F 3/011; G06F 40/284; G06F 2203/011; G06T 13/205; H04L 67/02
See application file for complete search history.

(56) References Cited

U.S. PATENT DOCUMENTS

| | | | | |
|---|---|---|---|---|
| 5,657,426 A * | 8/1997 | Waters | G10L 15/24 | 704/E15.041 |
| 6,250,928 B1 * | 6/2001 | Poggio | G09B 19/04 | 434/167 |
| 6,539,354 B1 * | 3/2003 | Sutton | G10L 13/00 | 704/E21.02 |
| 6,661,418 B1 * | 12/2003 | McMillan | G06T 13/205 | 704/E21.02 |

(Continued)

FOREIGN PATENT DOCUMENTS

| | | | |
|---|---|---|---|
| GB | 2406470 A * | 3/2005 | G06T 13/40 |
| WO | WO-2021006538 A1 * | 1/2021 | H04L 51/18 |
| WO | WO-2024088321 A1 * | 5/2024 | G06V 40/171 |

OTHER PUBLICATIONS

Mitsui, Kentaro, Yukiya Hono, and Kei Sawada. "Uniflg: Unified facial landmark generator from text or speech." arXiv preprint arXiv:2302.14337 (2023). (Year: 2023).*

(Continued)

*Primary Examiner* — Brian L Albertalli
(74) *Attorney, Agent, or Firm* — COOLEY LLP

(57) ABSTRACT

A non-transitory, processor-readable medium stores instructions that cause a processor to provide text data as input to a first machine learning model to determine an emotion state. The instructions further cause the processor to provide the text data and the emotion state as input to a second machine learning model to predict first viseme data that represents a first plurality of visemes. Frame data is generated based on the text data and the emotion state. A first (Continued)

300 portion of the first viseme data and first portion of the frame data is streamed to a user compute device, and while the first portion of the first viseme data and the first portion of the frame data is being streamed to the user compute device, the frame data is iteratively provided as input to a third machine learning model to generate second viseme data that represents a second plurality of visemes.

20 Claims, 6 Drawing Sheets

(56) References Cited

U.S. PATENT DOCUMENTS

| | | | | |
|---|---|---|---|---|
| 2003/0149569 | A1* | 8/2003 | Jowitt | G10L 21/10<br>704/E21.02 |
| 2008/0163074 | A1* | 7/2008 | Tu | G10L 13/08<br>704/E21.02 |
| 2020/0279553 | A1* | 9/2020 | McDuff | G10L 25/78 |
| 2021/0390945 | A1* | 12/2021 | Zhang | G10L 13/027 |
| 2022/0108510 | A1* | 4/2022 | Sagar | G06T 13/205 |
| 2025/0086869 | A1* | 3/2025 | Chen | G06T 13/40 |
| 2025/0342635 | A1* | 11/2025 | Wolfensparger | G10L 15/1815 |

OTHER PUBLICATIONS

Dahmani, Sara, et al. "Conditional variational auto-encoder for text-driven expressive audiovisual speech synthesis." Interspeech 2019—20th Annual Conference of the International Speech Communication Association. 2019. (Year: 2019).*

Wang, Xu, et al. "Text2Lip: Progressive Lip-Synced Talking Face Generation from Text via Viseme-Guided Rendering." arXiv preprint arXiv:2508.02362 (2025). (Year: 2025).*

Li, Lincheng, et al. "Write-a-speaker: Text-based emotional and rhythmic talking-head generation." Proceedings of the AAAI conference on artificial intelligence. vol. 35. No. 3. 2021. (Year: 2021).*

Zhang, Sibo, et al. "Text2video: Text-driven talking-head video synthesis with personalized phoneme-pose dictionary." ICASSP 2022-2022 IEEE international conference on acoustics, speech and signal processing (ICASSP). IEEE, 2022. (Year: 2022).*

Aneja, Deepali, and Wilmot Li. "Real-time lip sync for live 2d animation." arXiv preprint arXiv:1910.08685 (2019). (Year: 2019).*

* cited by examiner

SYSTEMS AND METHODS TO PREDICT VISEMES BASED ON TEXT DATA AND AUDIO FRAMES TO FACILITATE DISPLAY OF ANIMATIONS

FIELD

One or more embodiments described herein relate to the field of computer graphic processing and, more specifically, to systems and methods configured to (1) predict text-based visemes based on received text data and inferred emotions, (2) generate audio-based visemes based on generated audio, and (3) cause display of animations based on the text-based visemes and/or the audio-based visemes.

BACKGROUND

A need exists for systems and methods configured to facilitate real-time (or near real-time) animation of and/or interaction with emotional, expressive, and/or photorealistic agents.

SUMMARY

According to an embodiment, a non-transitory, processor-readable medium stores instructions that, when executed by a processor, cause the processor to receive text data and provide the text data as input to a first machine learning model to determine an emotion state represented by the text data. The instructions further cause the processor to provide the text data and the emotion state as input to a second machine learning model to predict first viseme data that represents a first plurality of visemes. Frame data is generated (e.g., via a background service) based on the text data and the emotion state, the frame data (1) encoding audio data that represents the text data and (2) defining a clock. A first portion of the first viseme data and first portion of the frame data is streamed to a user compute device based on the clock, and while the first portion of the first viseme data and the first portion of the frame data is being streamed to the user compute device, the frame data is iteratively provided as input to a third machine learning model to generate second viseme data that represents a second plurality of visemes. In response to generating the second viseme data, the instructions cause the processor to (1) cause (a) a portion of the second viseme data and (b) a second portion of the frame data to be streamed to the user compute device based on the clock, and (2) exclude a second portion of the first viseme data from being streamed to the user compute device.

According to an embodiment, a non-transitory, processor-readable medium stores instructions that, when executed by a processor, cause the processor to receive text data and provide the text data as input to a first machine learning model to determine an emotion state represented by the text data. The instructions further cause the processor to provide the text data and the emotion state as input to a second machine learning model to generate predicted viseme data. Audio data is generated based on the text data and the emotion state, the audio data representing the text data and defining a clock, and a first portion of the predicted viseme data and a first portion of the audio data is streamed to a user compute device based on the clock. While the first portion of the predicted viseme data and the first portion of the audio data is being streamed to the user compute device, the audio data is provided as input to a third machine learning model to generate audio-based viseme data. In response to generating the audio-based viseme data, the instructions cause the processor to cause (1) a portion of the audio-based viseme data and (2) a second portion of the audio data to be streamed to the user compute device based on the clock. A second portion of the predicted viseme data is excluded from being streamed to the user compute device, the portion of the audio-based viseme data, the second portion of the audio data, and the second portion of the predicted viseme data being associated with a time specified by the clock.

According to an embodiment, a method includes receiving, via a processor, text data; predicting, via the processor, an emotion state based on the text data; and predicting, via the processor, predicted viseme data based on the text data and the emotion state. The method further includes iteratively generating, via the processor, audio data based on the text data and the emotion state, the audio data (1) representing the text data and defining a clock. During the iteratively generating, a first portion of the audio data is stored, via the processor, in a buffer, and in response the first portion of the audio data stored in the buffer having at least a predefined length, the method includes causing, via the processor, (1) a first portion of the predicted viseme data and (2) the first portion of the audio data to be streamed to a user compute device based on the clock. While the first portion of the predicted viseme data and the first portion of the audio data is being streamed to the user compute device, the method includes generating, via the processor, audio-based viseme data based on the audio data. In response to generating the audio-based viseme data, the method includes causing, via the processor, (1) a portion of the audio-based viseme data and (2) a second portion of the audio data to be streamed to the user compute device based on the clock. Also in response to generating the audio-based viseme data, the method includes excluding, via the processor, a second portion of the predicted viseme data from being streamed to the user compute device, the portion of the audio-based viseme data, the second portion of the audio data, and the second portion of the predicted viseme data being associated with a time specified by the clock.

DETAILED DESCRIPTION

At least some systems and methods described herein are configured to generate animation and/or audio data to implement an emotional, expressive, and/or photorealistic agent that can efficiently converse with a user. At least some systems and methods described herein are configured to reduce the agent's response time (e.g., to under about 0.2 seconds) by outputting interim text-based data while concurrently processing audio-based data, instead of waiting for the audio-based data processing to finish.

Figure 1:
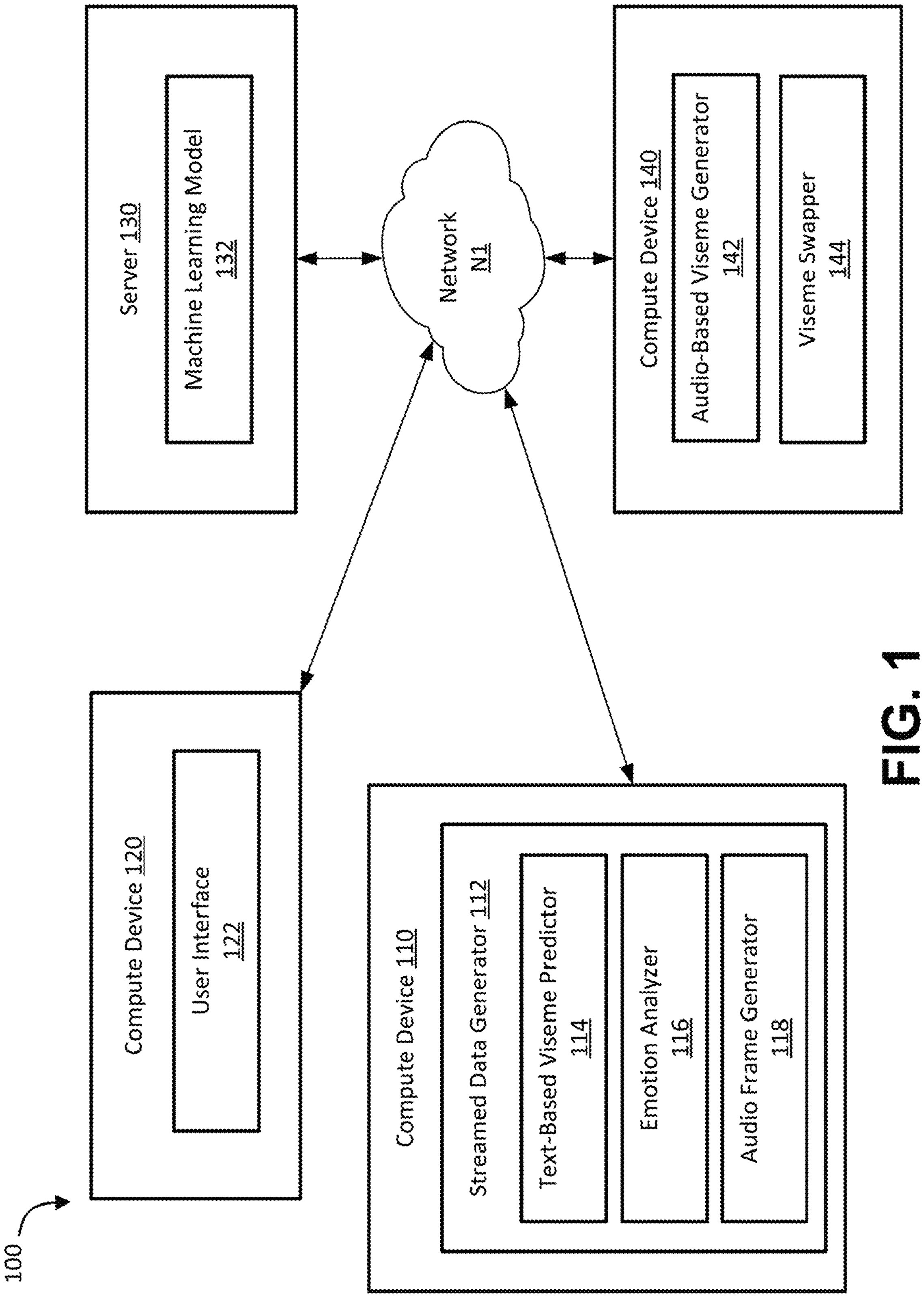
FIG. 1 shows a system block diagram of an animation system, according to an embodiment.

FIG. 1 shows a system block diagram of an animation system 100, according to an embodiment. The animation system 100 includes a compute device 110, a compute device 120, a server 130, a compute device 140, and a network N1. The animation system 100 can include alternative configurations, and various steps and/or functions of the processes described below can be shared among the various devices of the animation system 100 or can be assigned to specific devices (e.g., the compute device 110, the compute device 120, the server 130, the compute device 140, and/or the like) different from the descriptions herein. For example, in some configurations, a user can provide inputs and/or receive outputs (as described herein) directly to/from the compute device 110 and/or the compute device 140, rather than via the compute device 120.

In some implementations, the compute device 110, the compute device 120, the server 130, and/or the compute device 140 can include any suitable hardware-based computing devices and/or multimedia devices, such as, for example, a server, a desktop compute device, a smartphone, a tablet, a wearable device, a laptop and/or the like. In some implementations, the compute device 110, the compute device 120, the server 130, and/or the compute device 140 can be implemented at an edge (e.g., with respect to the network N1) node or other remote (e.g., with respect to the network N1) computing facility and/or device. In some implementations, each of the compute device 110, the compute device 120, the server 130, and/or the compute device 140 can be (or be included in) a data center or other control facility and/or device configured to run and/or execute a distributed computing system and can communicate with other compute devices.

The compute device 110 can include a streamed data generator 112, which can include software (1) stored at a memory that is functionally and/or structurally similar to the memory 210 of FIG. 2 discussed below and (2) executed via a processor that is functionally and/or structurally similar to the processor 220 of FIG. 2 discussed below. The streamed data generator 112 can be configured to receive text data and, based on this text data, can (1) predict text-based visemes (via the text-based viseme predictor 114), infer emotion states (via the emotion analyzer 116), and/or generate audio frame data (via the audio frame generator 118), as described herein. The streamed data generator 112 can be functionally and/or structurally similar to the streamed data generator 212 of FIG. 2. The text-based viseme predictor 114 can be functionally and/or structurally similar to the text-based viseme predictor 214 of FIG. 2 and/or the text-based viseme predictor 320 of FIG. 3. The emotion analyzer 116 can be functionally and/or structurally similar to the emotion analyzer 216 of FIG. 2 and/or the emotion analyzer 310 of FIG. 3. The audio frame generator 118 can be functionally and/or structurally similar to the audio frame generator 218 of FIG. 2 and/or the audio frame generator 330 of FIG. 3.

The compute device 120 can implement a user interface 122, which can include a programmatic interface (e.g., an application programming interface (API), a graphical user interface (GUI) (e.g., displayed on a monitor/display), and/or etc.) that is configured to receive input data (e.g., text data and/or audio data, as described herein) from a user. The user interface 122 can further cause return and/or display of output data generated by the streamed data generator 112 and/or the audio-based viseme generator 142 (described herein), such as animation data, generated audio data, and/or the like. The user interface 122 can be implemented via software and/or hardware, and can be functionally and/or structurally similar to the user interface 390 of FIG. 3.

The server 130 can include a remote (e.g., as to the compute device 110 and/or the compute device 120) compute device(s) that can be configured to train, host, and/or execute a machine learning model 132. The machine learning model 132 can be functionally and/or structurally similar to a machine learning model that (1) generates the input data I, (2) implements the text-based viseme predictor 320, (3) implements the audio frame generator 330, and/or (4) implements the audio-based viseme generator 360. The machine learning model 132 can include, for example, a large language model (LLM), a transformer-based model, a feed-forward neural network, a generative model (e.g., a generative adversarial networks (GAN), a diffusion model, and/or the like), and/or etc. In some implementations, the compute device 110 and/or the compute device 140 can execute a service (e.g., a prompt service) to provide input data to the machine learning model 132. Alternatively or in addition, although not shown in FIG. 1, the compute device 110 and/or the compute device 140 can train, host, and/or execute the machine learning model 132.

The compute device 140 can include an audio-based viseme generator 142 and a viseme swapper 144, each of which can include software (1) stored at a memory that is functionally and/or structurally similar to the memory 210 of FIG. 2 discussed below and (2) executed via a processor that is functionally and/or structurally similar to the processor 220 of FIG. 2 discussed below. The audio-based viseme generator 142 can be configured to generate audio-based viseme data based on audio frame data generated by the audio frame generator 118, as described herein. The viseme swapper 144 can be configured to replace text-based visemes generated by the text-based viseme predictor 114 with available audio-based visemes generated by the audio-based viseme generator 142, as described herein. The audio-based viseme generator 142 can be functionally and/or structurally similar to the audio-based viseme generator 360 of FIG. 3, and the viseme swapper 144 can be functionally and/or structurally similar to the viseme swapper 370 of FIG. 3.

The compute device 110 can be networked and/or communicatively coupled to the compute device 120, the server 130, and/or the compute device 140, via the network N1, using wired connections and/or wireless connections. The network N1 can include various configurations and protocols, including, for example, short range communication protocols, Bluetooth®, Bluetooth® LE, the Internet, World Wide Web, intranets, virtual private networks, wide area networks, local networks, private networks using communication protocols proprietary to one or more companies, Ethernet, WiFi® and/or Hypertext Transfer Protocol (HTTP), cellular data networks, satellite networks, free space optical networks and/or various combinations of the foregoing. Communication can be facilitated by any device capable of transmitting data to and from other compute devices, such as a modem(s) and/or a wireless interface(s).

In some implementations, although not shown in FIG. 1, the animation system 100 can include multiple compute devices 110, compute devices 120, servers 130, and/or compute devices 140. For example, in some implementations, the animation system 100 can include multiple compute devices 110 and/or 140, where each compute device 110 and/or 140 can be associated with a different user from multiple users. In some implementations, multiple compute devices 120 can be associated with a single user, where each compute device 120 can be associated with, for example, a different input modality (e.g., text input, audio input, analog and/or digital signal input, image input, video input, etc.). Some implementations can include various combinations of the above.

Figure 2:
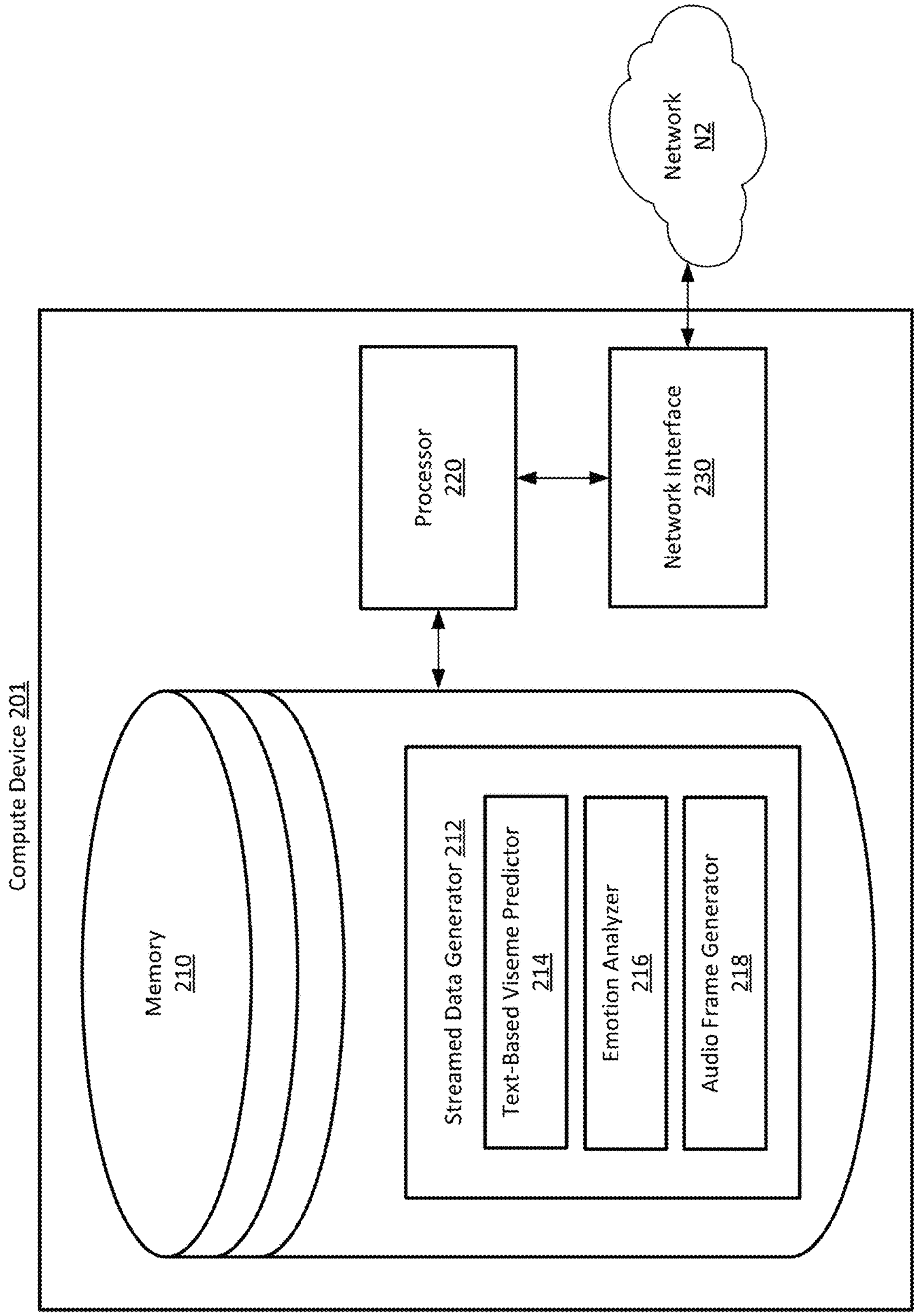
FIG. 2 shows a system block diagram of a compute device included in an animation system, according to an embodiment.

FIG. 2 shows a system block diagram of a compute device 201 included in an animation system, according to an embodiment. The compute device 201 can be structurally and/or functionally similar to, for example, the compute device 110 of the animation system 100 shown in FIG. 1. Although not shown in FIG. 2, the compute device 140 of FIG. 1 can also be structurally similar to the compute device 201. The compute device 201 can be a hardware-based computing device, a multimedia device, or a cloud-based device such as, for example, a computer device, a server, a desktop compute device, a laptop, a smartphone, a tablet, a wearable device, a remote computing infrastructure, and/or the like. The compute device 201 includes a memory 210, a processor 220, and a network interface 230 operably coupled to a network N2.

The processor 220 can be, for example, a hardware-based integrated circuit (IC), or any other suitable processing device configured to run and/or execute a set of instructions or code (e.g., stored in memory 210). For example, the processor 220 can be a general-purpose processor, a central processing unit (CPU), an accelerated processing unit (APU), an application specific integrated circuit (ASIC), a field programmable gate array (FPGA), a programmable logic array (PLA), a complex programmable logic device (CPLD), a graphics processing unit (GPU), a programmable logic controller (PLC), a remote cluster of one or more processors associated with a cloud-based computing infrastructure and/or the like. The processor 220 is operatively coupled to the memory 210. In some implementations, for example, the processor 220 can be coupled to the memory 210 through a system bus (for example, address bus, data bus and/or control bus). In some implementations, the processor 220 can include multiple parallelly arranged processors.

The memory 210 can be, for example, a random-access memory (RAM), a memory buffer, a hard drive, a read-only memory (ROM), an erasable programmable read-only memory (EPROM), and/or the like. The memory 210 can store, for example, one or more software modules and/or code that can include instructions to cause the processor 220 to perform one or more processes, functions, and/or the like. In some implementations, the memory 210 can be a portable memory (e.g., a flash drive, a portable hard disk, and/or the like) that can be operatively coupled to the processor 220. In some instances, the memory can be remotely operatively coupled with the compute device 201, for example, via the network interface 230. For example, a remote database server can be operatively coupled to the compute device 201.

The memory 210 can store various instructions associated with processes, algorithms and/or data, as described herein. Memory 210 can further include any non-transitory computer-readable storage medium for storing data and/or software that is executable by processor 220, and/or any other medium, which may be used to store information that may be accessed by processor 220 to control the operation of the compute device 201. For example, the memory 210 can store data associated with a streamed data generator 212. The streamed data generator 212 can be configured to receive text data and, based on this text data, can (1) predict text-based visemes (via the text-based viseme predictor 214), infer emotion states (via the emotion analyzer 216), and/or generate audio frame data (via the audio frame generator 218), as described herein. The streamed data generator 212 can be functionally and/or structurally similar to the streamed data generator 112 of FIG. 1. The text-based viseme predictor 214 can be functionally and/or structurally similar to the text-based viseme predictor 114 of FIG. 1 and/or the text-based viseme predictor 320 of FIG. 3. The emotion analyzer 216 can be functionally and/or structurally similar to the emotion analyzer 116 of FIG. 1 and/or the emotion analyzer 310 of FIG. 3. The audio frame generator 218 can be functionally and/or structurally similar to the audio frame generator 118 of FIG. 1 and/or the audio frame generator 330 of FIG. 3.

The network interface 230 can be configured to connect to the network N2, which can be functionally and/or structurally similar to the network N1 of FIG. 1. For example, network N2 can use any of the communication protocols described above with respect to network N1 of FIG. 1. In some implementations, the network interface 230 can include a network interface controller (NIC) that implements a physical and/or data link layer (e.g., Ethernet, Wi-Fi®, etc.).

In some instances, the compute device 201 can further include a display, an input device, and/or an output interface (not shown in FIG. 2). The display can be any display device (e.g., a monitor, screen, etc.) by which the compute device 201 can output and/or display data (e.g., via a user interface that is structurally and/or functionally similar to the user interface 122 of FIG. 1). The input device can include, for example, a mouse, keyboard, touch screen, voice interface, and/or any other hand-held controller or device or interface via which a user may interact with the compute device 201. The output interface can include, for example, a bus, port, and/or other interfaces by which the compute device 201 may connect to and/or output data to other devices and/or peripherals.

Figure 3:
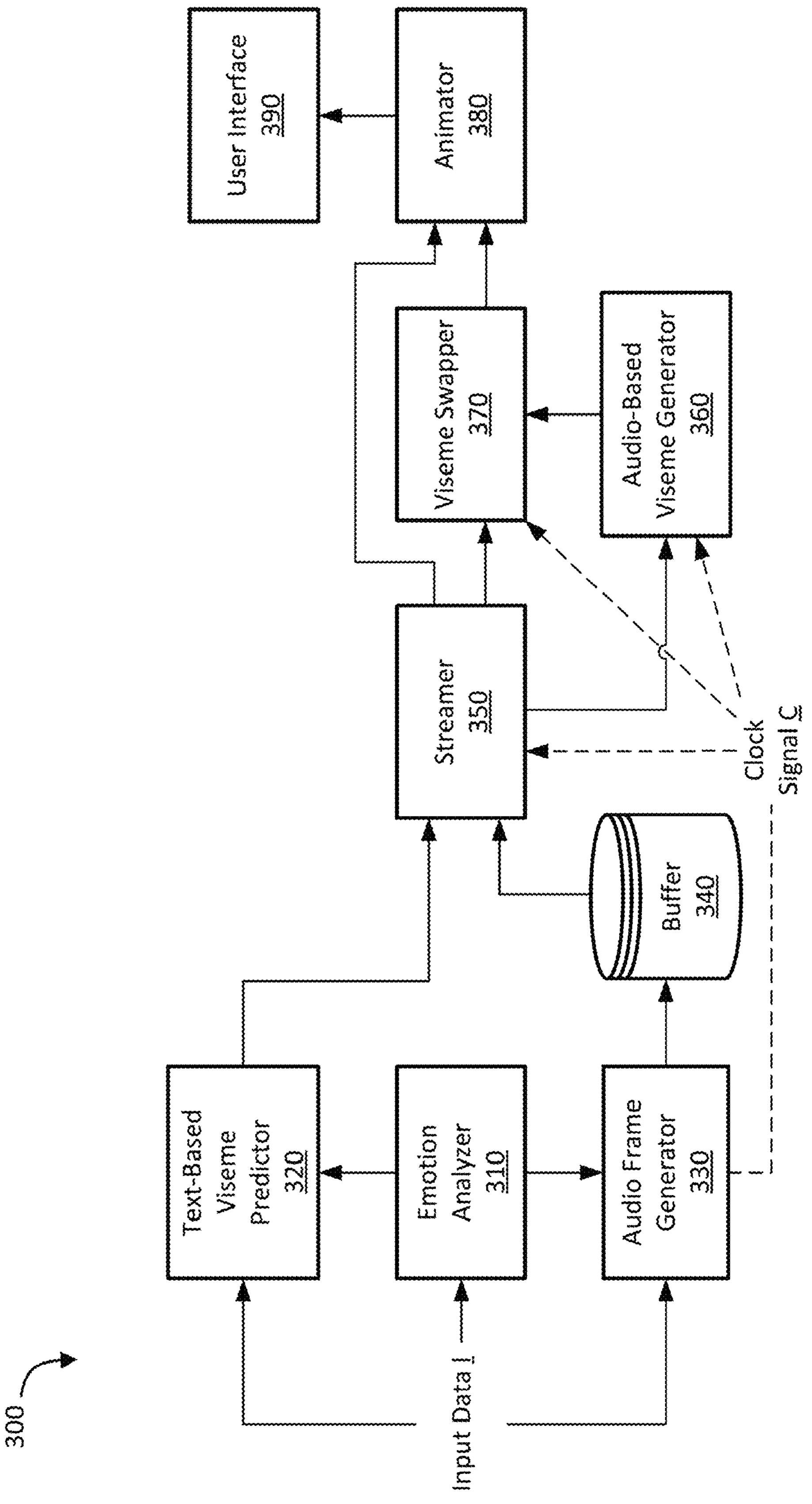
FIG. 3 shows a system block diagram of animation components included in an animation system, according to an embodiment.

FIG. 3 shows a system block diagram of animation components 300 included in an animation system, according to an embodiment. At least a portion of the animation components 300 can be associated with a compute device (e.g., a compute device that is structurally and/or functionally similar to the compute device 201 of FIG. 2 and/or the compute devices 110, 120, and/or 140 and/or the server 130 of FIG. 1). For example, the animation components 300 can include, be included in, implement, and/or be associated with (1) the streamed data generator 112 of FIG. 1 and/or (2) the streamed data generator 212 of FIG. 2. In some instances, the animation components 300 can include software stored in memory 210 and configured to execute via the processor 220 of FIG. 2. In some instances, at least a portion of the animation components 300 can be implemented in hardware (e.g., an ASIC) or a combination of hardware (e.g., a general-purpose processor) and software.

The animation components 300 receive input data I and include and/or have access to an emotion analyzer 310, a text-based viseme predictor 320, an audio frame generator 330, a buffer 340, a streamer 350, an audio-based viseme generator 360, a viseme swapper 370, an animator 380, and a user interface 390. The audio frame generator 330 can generate data (e.g., timestamp data associated with generated audio frames) that can implement a clock signal C. The emotion analyzer 310 can be functionally and/or structurally similar to the emotion analyzer 116 of FIG. 1 and/or the emotion analyzer 216 of FIG. 2. The text-based viseme predictor 320 can be functionally and/or structurally similar to the text-based viseme predictor 114 of FIG. 1 and/or the text-based viseme predictor 214 of FIG. 2. The audio frame generator 330 can be functionally and/or structurally similar to the audio frame generator 118 of FIG. 1 and/or the audio frame generator 218 of FIG. 2. The audio-based viseme generator 360 can be functionally and/or structurally similar to the audio-based viseme generator 142 of FIG. 1, and the viseme swapper 370 can be functionally and/or structurally similar to the viseme swapper 144 of FIG. 1. The user interface 390 can be functionally and/or structurally similar to the user interface 122 of FIG. 1.

The input data I can include, for example, text data that represents a response to be expressed by an animated character, an avatar, and/or the like. In some implementations, this text data can be generated by large language model (LLM) (e.g., executed via a server that is functionally and/or structurally similar to the server 130 of FIG. 1) that implements an artificial intelligence (AI) agent, which can be portrayed to a user (via the user interface 390) through the animated character, avatar, and/or the like. Alternatively or in addition, the input data I can include audio data that is transcribed (e.g., by a speech-to-text model, not shown in FIG. 3) to text data. For example, in some implementations, the animation system can record a user's speech to generate the audio data, such that the animation system can portray (e.g., contemporaneous to the user's speech) the animated character/avatar as relaying the user's speech in a voice, prosody, etc., of the animated character/avatar.

In some implementations, the input data I can include normalized text data produced by a normalizer (not shown in FIG. 3). For example, the normalizer can receive raw text data (e.g., from an LLM, from transcribed audio data, and/or the like) and can, for example, remove code fences, normalize and/or remove smart quotes and/or full-width punctuation, remove trailing whitespaces and/or duplicate blanks, collapse and/or remove control tokens (e.g., "(CONTINUE)"), and/or the like. In some implementations, the animation system can keep both the raw text data and the normalized/clean text data for use by downstream components of the animation components 300 (e.g., to improve inference accuracy while also reducing information loss).

The emotion analyzer 310 can receive the input data I and extract and/or infer one or more sentiments represented by the input data I. In some instances, the emotion analyzer 310 can extract, for example, leading JSON headers and/or explicit emotion marker. Alternatively or in addition, the emotion analyzer 310 can include or have access to an LLM (and/or a similarly suited machine learning model that is functionally and/or structurally similar to the machine learning model 132 of FIG. 1). The LLM can be configured (e.g., prompted) to infer sentiments from the input data I based on tone, keywords, and/or the like. The emotion analyzer 310 can construct a payload (e.g., a representation having a predefined format) based on the extracted and/or inferred sentiments, such that these sentiments are structured to facilitate determination of an emotion state. To determine this emotion state, the emotion analyzer 310 can map (e.g., through inexact/near matches) sentiments to a predefined/canonical set of emotion states (e.g., "SURPRISE" to "SURPRISED," "CONTEMPT" to "CRITICISM," and/or the like). In some implementations, sentiment signals can be received by the emotion analyzer 310 from multiple sources (e.g., streaming deltas, final completions, manual overrides, and/or etc.). In some implementations, if the emotion analyzer 310 cannot extract and/or infer a sentiment from the input data I, the emotion analyzer 310 can assign a predefined emotion state (e.g., a NEUTRAL state and/or the like, as opposed to, for example, a DEFAULT emotion state).

In some implementations, where the input data I includes audio data representing a user's speech, the emotion analyzer 310 can infer emotion based on a characteristic(s) of the user's speech, such as tone, cadence, prosody, and/or etc. In some implementations, where the input data I is received from an AI agent (e.g., implemented by an LLM), the input data I can encode an emotion(s) (e.g., predetermined by the LLM), and the emotion analyzer 310 can extract the this emotion from the input data I.

The text-based viseme predictor 320 can include a machine learning model (e.g., feedforward neural network) configured to embed the text data of the input data I and generate, based on this embedded text data, a structured viseme (e.g., mouth shape) sequence. More specifically, a viseme (also referred to herein as viseme data) can represent positions of facial and/or mouth landmarks associated with annunciation of a given sound (e.g., a phoneme). The structured viseme sequence can serve as a precursor for lip motion prediction (e.g., performed by the animator 380, described herein). In some implementations, the text-based viseme predictor 320 can also receive the emotion state from the emotion analyzer 310 as input to influence viseme generation. For example, in response to the emotion state indicating a surprised emotion, the text-based viseme predictor 320 can generate visemes that represent more exaggerated mouth/face positions than for a neutral emotion. The text-based visemes generated by the text-based viseme predictor 320 are also referred to herein as predicted viseme data.

The audio frame generator 330 can include a text-to-speech (TTS) machine learning model (e.g., a neural network configured for acoustic feature generation), which can produce audio data that represents the text data of the input data I. In some implementations, the audio frame generator 330 can also receive the emotion state from the emotion analyzer 310, such that the produced audio data reflects the emotion state. For example, the emotion analyzer 310 can generate audio data having a faster cadence, more dramatic prosody, and/or the like, for a surprised emotion as compared to a neutral emotion.

In some implementations, the audio frame generator 330 can be implemented as a background service (e.g., a background Python service and/or the like) that can be configured to remain alive (e.g., via a Node service/wrapper that can validate and/or auto-install dependencies to cause deployments to be self-contained, and/or the like). In some implementations, this background service can be pre-loaded upon server startup instead of running on different requests, improving response time and reducing lag.

In some implementations, the audio data generated by the audio frame generator 330 can include audio frame data (e.g., pulse-code modulation (PCM) frame data and/or the like) having a format of, for example, 24 kHz, 16-bit signed integer little-endian (s16le), and/or monophonic (mono) audio, and/or the like. For example, the audio frame generator 330 can stream incremental base64-encoded PCM frames (e.g., through a stdout function) instead of waiting for a whole utterance to be received, reducing lag. In some implementation, each audio frame (e.g., chunk) from the audio frame data can include 1,920 bytes and/or the like. In some implementations, the audio frame generator 330 can be further configured to generate crossfade data (e.g., 64-sample crossfade data and/or the like) that can be interposed between the audio frames from the produced audio frame data to mask/reduce perception of frame boundaries.

The audio frame generator 330 can output the audio frame data to the buffer 340, which can include a memory configured to store and facilitate first-in-first-out (FIFO) retrieval of the audio frame data. Because the audio frame generator 330 can take longer to produce a full set of audio frame data than the text-based viseme predictor 320 can generate the text-based visemes, the buffer 340 can be configured to output a portion of the audio frame data while the audio frame generator 330 generates the remaining audio frame data. For example, the buffer 340 can output the portion of the audio frame data in response to at least a predefined amount of audio frame data (e.g., more than 0.1 seconds) being produced by the audio frame generator 330 and stored at the buffer 340.

While the audio frame generator 330 continues to produce the remaining audio frame data, the text-based viseme predictor 320 can provide the text-based visemes to the streamer 350, and the buffer 340 can provide the produced portion of the audio frame data to the streamer 350.

The streamer 350 can facilitate transfer (e.g., hypertext transfer protocol (HTTP) chunked transfer) of the text-based visemes and the produced portion of the audio frame data to at least one of the audio-based viseme generator 360, the viseme swapper 370, and/or the animator 380, each described further below. The audio-based viseme generator 360, the viseme swapper 370, and/or the animator 380 can, in some implementations, be configured to be executed via a client compute device(s) (e.g., functionally and/or structurally similar to the compute device 140), whereas at least some of the components upstream of and including the streamer 350 can be executed via a server compute device(s) (e.g., functionally and/or structurally similar to the compute device 110). The streamer 350 can therefore facilitate transfer between these devices. In some implementations, the streamer 350 can be configured to handle backpressure by pausing on socket blocks and/or resuming on drain. In some implementations, the streamer 350 can implement error handling by recording latency milestones, including causes, such as tts-stream-error and/or tts-no-audio. In some implementations, the streamer 350 can be configured to claim a room-scoped runtime and/or a latency probe (e.g., t1-t5).

Turning to the audio-based viseme generator 360 in more detail, this component can generate audio-based visemes (also referred to herein as audio-based viseme data) based on the audio frame data produced by the audio frame generator 330. The audio-based viseme generator 360 can include, for example, an Oculus® Lipsync model and/or the like. In some implementations, the text-based visemes from the text-based viseme predictor 320 can be available sooner than the audio-based visemes because of the additional time involved in generating (1) the audio frame data via the audio frame generator 330 and/or (2) the audio-based visemes themselves via the audio-based viseme generator 360.

To reduce delay in displaying an animation to the user, the streamer 350 can provide the produced portion of the audio frame data and the text-based visemes to the animator 380 while the audio-based viseme generator 360 continues to generate visemes. In some implementations, the streamer 350 can be configured to automatically send the text-based visemes to the animator 380 until after the audio frame generator 330 has generated a predetermined amount of audio frame data and/or until a predetermined amount of time has lapsed from the receipt of the input data I (e.g., to avoid checking for audio-based visemes that the audio-based viseme generator 360 is unlikely to have yet generated, conserving compute resources as a result).

Alternatively or in addition, the viseme swapper 370 can receive the text-based visemes and check whether any audio-based visemes are available for a given timestamp. This timestamp can be represented by the clock signal C, which can be predicated on the audio frame data generated by the audio frame generator 330. Similarly stated, the streamer 350, audio-based viseme generator 360, and viseme swapper 370 can defer to the audio playback position of the audio frame data when aligning visemes to the audio frame data. As a result, the audio frame data can serve as a "master clock," improving alignment and/or minimizing drift between the audio frame data, the text-based visemes, and the audio-based visemes. This clock signal C can further reduce errors that can arise from streaming jitter and/or streaming stalls associated with the streamer 350, buffer bursts associated with the buffer 340, variable server timing, and/or etc.

In response to the viseme swapper 370 determining that an audio-based viseme is available for a given timestamp, the viseme swapper 370 can replace the text-based viseme for the given timestamp with the audio-based viseme. Because an audio-based viseme can be more accurate than a text-based viseme, which, in at least some instances, involves greater inference, the viseme swapper 370 can facilitate improved animation quality while reducing lag by using text-based visemes if audio-based visemes are not available.

In response to receiving the text-based and/or audio-based visemes, the animator 380 can render animation data that represents a character having facial and/or mouth motion represented by the text-based and/or audio-based visemes. The animator 380 can include a computer graphics engine (e.g., a game engine, such as an Unreal engine and/or the like) configured to render 2-dimensional and/or 3-dimensional graphics based on the visemes (e.g., using ray tracing and/or the like). The animator 380 can further include an audio engine configured to convert audio frame data to an audio format suitable for playback (e.g., a .wav format, a .ogg format, a opus format, and/or the like). The resulting animation and/or audio can be conveyed to the user via the user interface 390.

Figure 4:
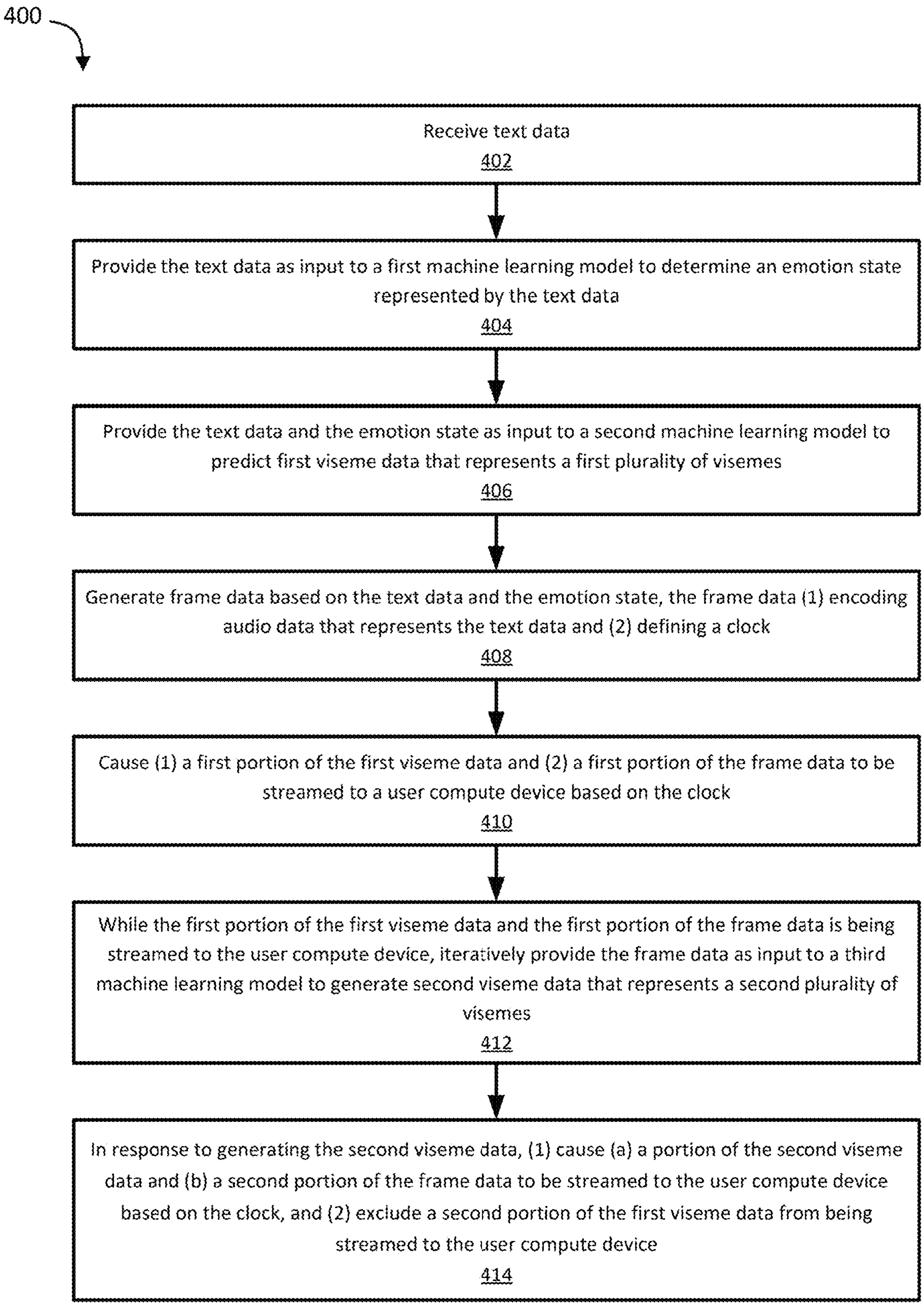
FIG. 4 shows a flow diagram illustrating a method for causing a portion of second viseme data, and not a portion of first viseme data, to be streamed to a user compute device, according to an embodiment.

FIG. 4 shows a flow diagram illustrating a method 400 for causing a portion of second viseme data, and not a portion of first viseme data, to be streamed to a user compute device, according to an embodiment. In some instances, the method 400 can be implemented by an animation system (e.g., the animation system 100 of FIG. 1). Portions of the method 400 can be implemented using a processor (e.g., the processor 220 of FIG. 2) of any suitable compute device (e.g., the compute device 201 of FIG. 2 and/or the compute devices 110, 120, and/or 140 and/or the server 130 of FIG. 1).

The method 400 at 402 includes receiving text data and, at 404, providing the text data as input to a first machine learning model to determine an emotion state represented by the text data. The method 400 at 406 includes providing the text data and the emotion state as input to a second machine learning model to predict first viseme data that represents a first plurality of visemes. Frame data is generated at 408 based on the text data and the emotion state, the frame data (1) encoding audio data that represents the text data and (2) defining a clock. A first portion of the first viseme data and first portion of the frame data is streamed at 410 to a user compute device based on the clock, and at 412, while the first portion of the first viseme data and the first portion of the frame data is being streamed to the user compute device, the frame data is iteratively provided as input to a third machine learning model to generate second viseme data that represents a second plurality of visemes. In response to generating the second viseme data, the method 400 at 414 includes (1) causing (a) a portion of the second viseme data and (b) a second portion of the frame data to be streamed to the user compute device based on the clock, and (2) excluding a second portion of the first viseme data from being streamed to the user compute device.

Figure 5:
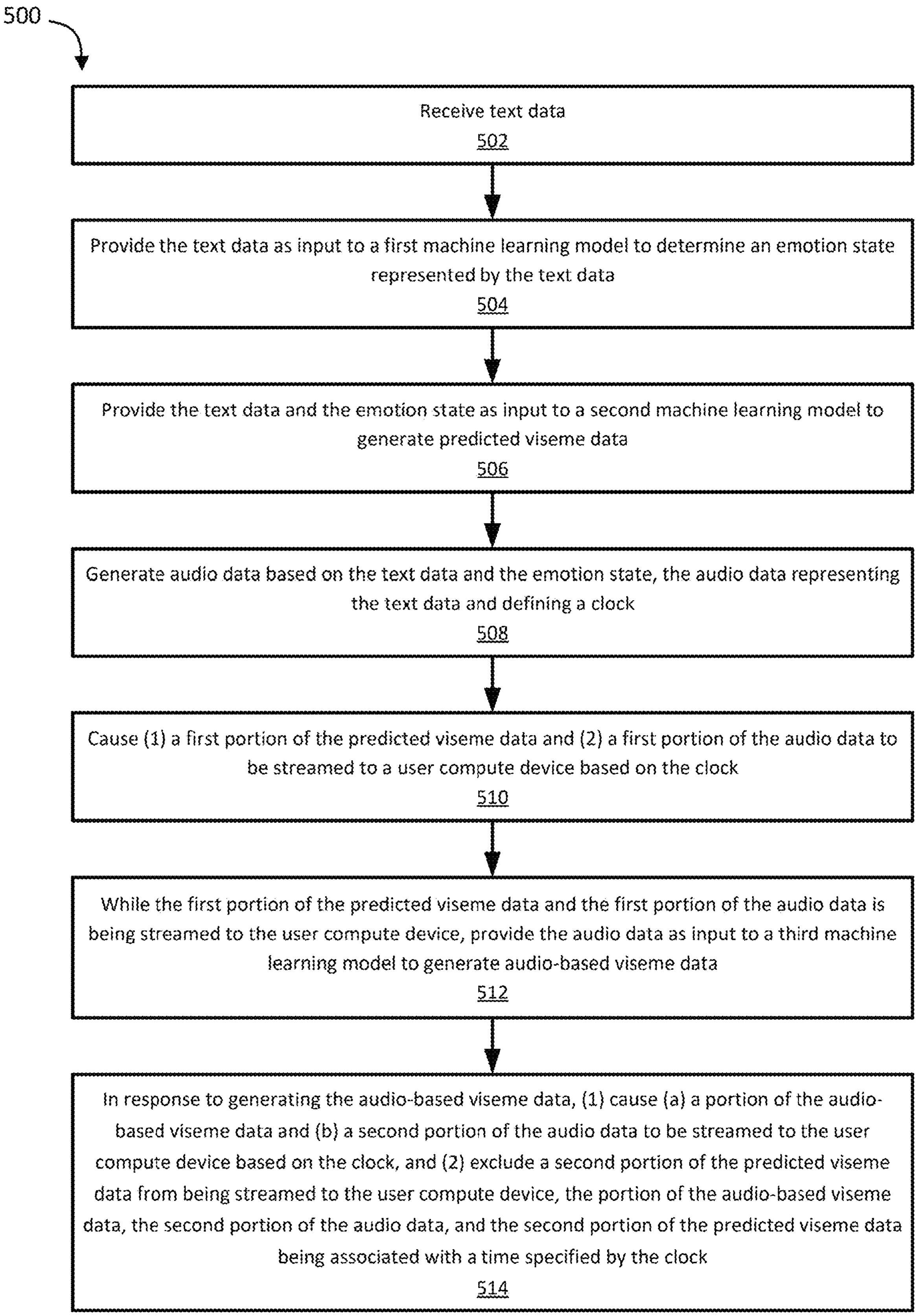
FIG. 5 shows a flow diagram illustrating a method for streaming predicted and audio-based viseme data, according to an embodiment.

FIG. 5 shows a flow diagram illustrating a method 500 for streaming predicted and audio-based viseme data, according to an embodiment. In some instances, the method 500 can be implemented by an animation system (e.g., the animation system 100 of FIG. 1). Portions of the method 500 can be implemented using a processor (e.g., the processor 220 of FIG. 2) of any suitable compute device (e.g., the compute device 201 of FIG. 2 and/or the compute devices 110, 120, and/or 140 and/or the server 130 of FIG. 1).

The method 500 at 502 includes receiving text data and, at 504, providing the text data as input to a first machine learning model to determine an emotion state represented by the text data. The method 500 at 506 includes providing the text data and the emotion state as input to a second machine learning model to generate predicted viseme data. Audio data is generated at 508 based on the text data and the emotion state, the audio data representing the text data and defining a clock, and a first portion of the predicted viseme data and a first portion of the audio data is streamed at 510 to a user compute device based on the clock. While the first portion of the predicted viseme data and the first portion of the audio data is being streamed to the user compute device, the audio data is provided as input to a third machine learning model at 512 to generate audio-based viseme data. In response to generating the audio-based viseme data, the method 500 at 514 includes causing (1) a portion of the audio-based viseme data and (2) a second portion of the audio data to be streamed to the user compute device based on the clock. Also at 514, a second portion of the predicted viseme data is excluded from being streamed to the user compute device, the portion of the audio-based viseme data, the second portion of the audio data, and the second portion of the predicted viseme data being associated with a time specified by the clock.

Figure 6:
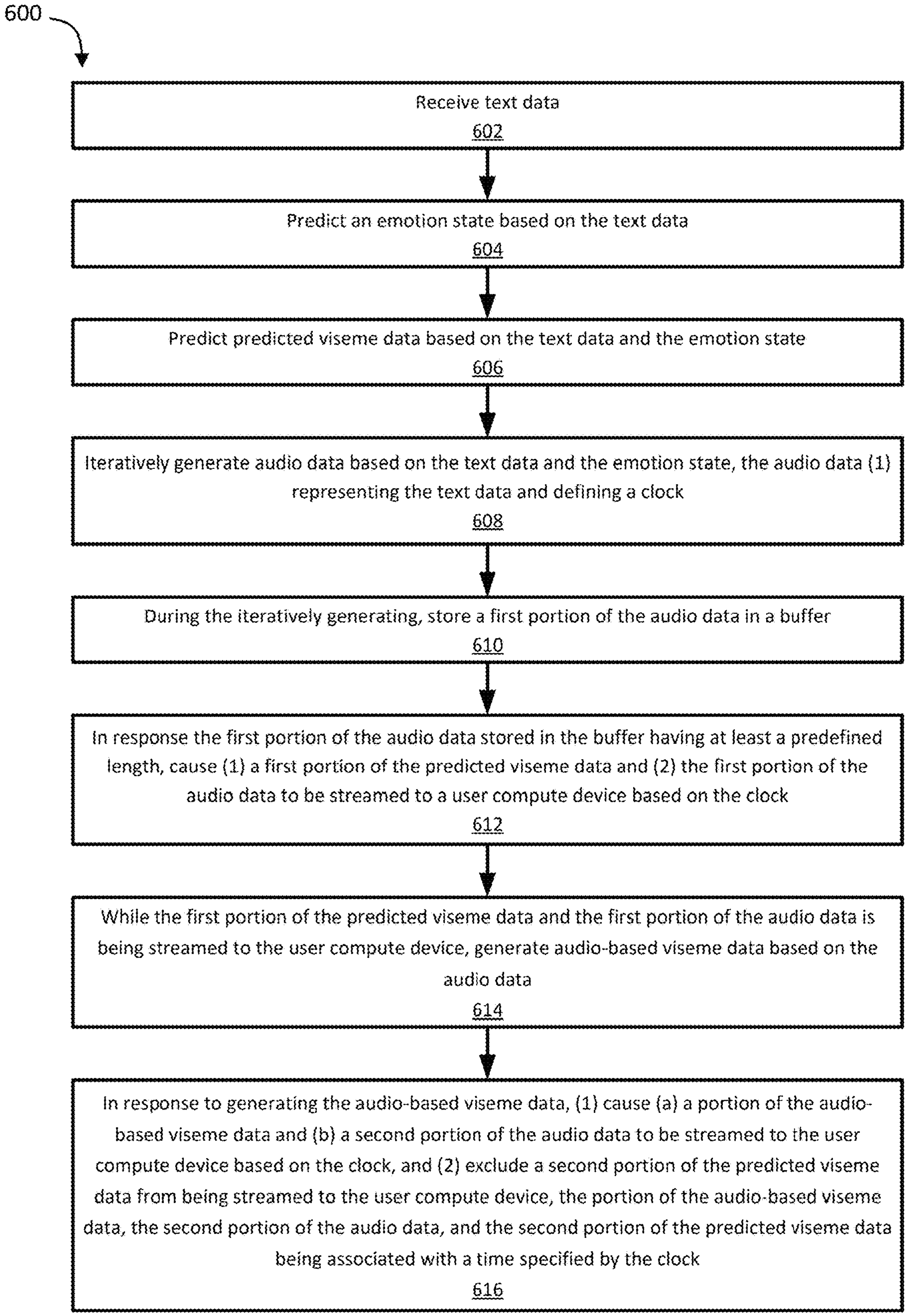
FIG. 6 shows a flow diagram illustrating a method for causing a portion of audio-based viseme data, and not a portion of predicted viseme data, to be streamed to a user compute device, according to an embodiment.

FIG. 6 shows a flow diagram illustrating a method 600 for causing a portion of audio-based viseme data, and not a portion of predicted viseme data, to be streamed to a user compute device, according to an embodiment. In some instances, the method 600 can be implemented by an animation system (e.g., the animation system 100 of FIG. 1). Portions of the method 600 can be implemented using a processor (e.g., the processor 220 of FIG. 2) of any suitable compute device (e.g., the compute device 201 of FIG. 2 and/or the compute devices 110, 120, and/or 140 and/or the server 130 of FIG. 1).

The method 600 at 602 includes receiving, via a processor, text data; at 604, predicting, via the processor, an emotion state based on the text data; and at 606, predicting, via the processor, predicted viseme data based on the text data and the emotion state. The method 600 at 608 includes iteratively generating, via the processor, audio data based on the text data and the emotion state, the audio data (1) representing the text data and defining a clock. During the iteratively generating, a first portion of the audio data is stored, at 610 and via the processor, in a buffer, and at 612, in response the first portion of the audio data stored in the buffer having at least a predefined length, the method 600 includes causing, via the processor, (1) a first portion of the predicted viseme data and (2) the first portion of the audio data to be streamed to a user compute device based on the clock. While the first portion of the predicted viseme data and the first portion of the audio data is being streamed to the user compute device, the method 600 at 614 includes generating, via the processor, audio-based viseme data based on the audio data. In response to generating the audio-based viseme data, the method 600 at 616 includes causing, via the processor, (1) a portion of the audio-based viseme data and (2) a second portion of the audio data to be streamed to the user compute device based on the clock. Also at 616, the method 600 includes excluding, via the processor, a second portion of the predicted viseme data from being streamed to the user compute device, the portion of the audio-based viseme data, the second portion of the audio data, and the second portion of the predicted viseme data being associated with a time specified by the clock.

According to an embodiment, a computer-implemented method executed by a processor for continuous self-supervised learning includes receiving experiences expressed in natural language from an environment and identifying experiences that are salient based on contextual novelty or inferred contradiction determined by the substrate. The computer-implemented method further includes storing said experiences as episodic representations in a first memory layer, and consolidating said representations into generalized knowledge within a second memory layer through a micro-sleep process that performs contradiction-aware consolidation and revision. Additionally, the computer-implemented method includes updating said generalized knowledge by revising or removing contradictions detected during subsequent execution, wherein adaptation occurs through inference-based consolidation and revision, without gradient updates.

According to an embodiment, a continuous-learning system includes (1) a reasoning substrate configured to perform inference and representation within the learning system, (2) a first memory layer configured to store episodic representations, (3) a second memory layer configured to maintain generalized knowledge, and (4) a controller configured to perform at least some methods described herein.

In some implementations, the system maintains contradiction records across consolidation cycles and revises stored generalizations upon repeated contradictory observations. In some implementations, the micro-sleep consolidation process is scheduled based on system load, deferring consolidation during high compute demand and resuming during low-load intervals. In some implementations, each episodic representation comprises a structured tuple including a contextual precondition, an observed action, and a resulting outcome, thereby preserving causal structure during compression. In some implementations, the system further includes an energy-aware scheduler configured to coordinate consolidation cycles among distributed instances to reduce power consumption while maintaining learning continuity. In some implementations, the reasoning substrate operates through contextual representations expressed in natural language or equivalent semantic form. In some implementations, the system enables task adaptation in an autonomous system by applying existing generalized knowledge to novel task specifications without involving reprogramming or retraining of underlying models.

Examples of computer code include, but are not limited to, micro-code or micro-instructions, machine instructions, such as produced by a compiler, code used to produce a web service, and files containing higher-level instructions that are executed by a computer using an interpreter. For example, embodiments can be implemented using Python, Java, JavaScript, C++, and/or other programming languages and development tools. Additional examples of computer code include, but are not limited to, control signals, encrypted code, and compressed code.

The drawings primarily are for illustrative purposes and are not intended to limit the scope of the subject matter described herein. The drawings are not necessarily to scale; in some instances, various aspects of the subject matter disclosed herein can be shown exaggerated or enlarged in the drawings to facilitate an understanding of different features. In the drawings, like reference characters generally refer to like features (e.g., functionally similar and/or structurally similar elements).

The acts performed as part of a disclosed method(s) can be ordered in any suitable way. Accordingly, embodiments can be constructed in which processes or steps are executed in an order different than illustrated, which can include performing some steps or processes simultaneously, even though shown as sequential acts in illustrative embodiments. Put differently, it is to be understood that such features can not necessarily be limited to a particular order of execution, but rather, any number of threads, processes, services, servers, and/or the like that can execute serially, asynchronously, concurrently, in parallel, simultaneously, synchronously, and/or the like in a manner consistent with the disclosure. As such, some of these features can be mutually contradictory, in that they cannot be simultaneously present in a single embodiment. Similarly, some features are applicable to one aspect of the innovations, and inapplicable to others.

Where a range of values is provided, it is understood that each intervening value, to the tenth of the unit of the lower limit unless the context clearly dictates otherwise, between the upper and lower limit of that range and any other stated or intervening value in that stated range is encompassed within the disclosure. That the upper and lower limits of these smaller ranges can independently be included in the smaller ranges is also encompassed within the disclosure, subject to any specifically excluded limit in the stated range. Where the stated range includes one or both of the limits, ranges excluding either or both of those included limits are also included in the disclosure.

The phrase "and/or," as used herein in the specification and in the embodiments, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements can optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the embodiments, "or" should be understood to have the same meaning as "and/or" as defined above. For example, when separating items in a list, "or" or "and/or" shall be interpreted as being inclusive, i.e., the inclusion of at least one, but also including more than one of a number or list of elements, and, optionally, additional unlisted items. Only terms clearly indicated to the contrary, such as "only one of" or "exactly one of," or, when used in the embodiments, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of." "Consisting essentially of," when used in the embodiments, shall have its ordinary meaning as used in the field of patent law.

As used herein in the specification and in the embodiments, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements can optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the embodiments, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

Some embodiments described herein relate to a computer storage product with a non-transitory computer-readable medium (also can be referred to as a non-transitory processor-readable medium and/or a machine-readable medium) having instructions or computer code thereon for performing various computer-implemented operations. The computer-readable medium (or processor-readable medium, machine-readable medium, etc.) is non-transitory in the sense that it does not include transitory propagating signals per se (e.g., a propagating electromagnetic wave carrying information on a transmission medium such as space or a cable). The media and computer code (also can be referred to as code) can be those designed and constructed for the specific purpose or purposes. Examples of non-transitory computer-readable media include, but are not limited to, magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), Read-Only Memory (ROM)

and Random-Access Memory (RAM) devices. Other embodiments described herein relate to a computer program product, which can include, for example, the instructions and/or computer code discussed herein.

Some embodiments and/or methods described herein can be performed by software (executed on hardware), hardware, or a combination thereof. Hardware modules can include, for example, a processor, a field programmable gate array (FPGA), and/or an application specific integrated circuit (ASIC). Software modules (executed on hardware) can include instructions stored in a memory that is operably coupled to a processor and can be expressed in a variety of software languages (e.g., computer code), including C, C++, Java™, Ruby, Visual Basic™, and/or other object-oriented, procedural, or other programming language and development tools. Examples of computer code include, but are not limited to, micro-code or micro-instructions, machine instructions, such as produced by a compiler, code used to produce a web service, and files containing higher-level instructions that are executed by a computer using an interpreter. For example, embodiments can be implemented using imperative programming languages (e.g., C, Fortran, etc.), functional programming languages (Haskell, Erlang, etc.), logical programming languages (e.g., Prolog), object-oriented programming languages (e.g., Java, C++, etc.) or other suitable programming languages and/or development tools. Additional examples of computer code include, but are not limited to, control signals, encrypted code, and compressed code.

What is claimed is:

1. A non-transitory, processor-readable medium storing instructions that, when executed by a processor, cause the processor to:

receive text data;

provide the text data as input to a first machine learning model to determine an emotion state represented by the text data;

provide the text data and the emotion state as input to a second machine learning model to predict first viseme data that represents a first plurality of visemes;

generate frame data based on the text data and the emotion state, the frame data (1) encoding audio data that represents the text data and (2) defining a clock;

cause (1) a first portion of the first viseme data and (2) a first portion of the frame data to be streamed to a user compute device based on the clock;

while the first portion of the first viseme data and the first portion of the frame data is being streamed to the user compute device, iteratively provide the frame data as input to a third machine learning model to generate second viseme data that represents a second plurality of visemes; and in response to generating the second viseme data:

cause (1) a portion of the second viseme data and (2) a second portion of the frame data to be streamed to the user compute device based on the clock, and exclude a second portion of the first viseme data from being streamed to the user compute device.

2. The non-transitory, processor-readable medium of claim 1, wherein:

the frame data includes a plurality of pulse-code modulation (PCM) frames.

3. The non-transitory, processor-readable medium of claim 1, wherein the instructions to cause the processor to determine the emotion state include instructions to cause the processor to:

provide the text data as input to the first machine learning model to identify a plurality of sentiments represented by the text data; and compare a first sentiment and a second sentiment, from the plurality of sentiments, to determine the emotion state.

4. The non-transitory, processor-readable medium of claim 1, further storing instructions to cause the processor to:

receive raw text data; and remove at least one of a code fence, a smart quote, a full-width punctuation, a trailing whitespace, a duplicative blank, or a control token, from the raw text data to produce the text data.

5. The non-transitory, processor-readable medium of claim 1, wherein the frame data represents a plurality of audio frames and crossfade frames interposed between the plurality of audio frames.

6. The non-transitory, processor-readable medium of claim 1, wherein the instructions to cause the processor to cause the first portion of the first viseme data and the first portion of the frame data to be streamed include instructions to cause the processor to:

cause the first portion of the first viseme data and the first portion of the frame data to be streamed to the user compute device via a Hypertext Transfer Protocol (HTTP) chunked transfer.

7. The non-transitory, processor-readable medium of claim 1, wherein:

the first machine learning model includes a large language model (LLM).

8. The non-transitory, processor-readable medium of claim 1, further storing instructions to cause the processor to:

cause an animation to be rendered at the user compute device based on the first portion of the first viseme data, while the instructions cause the processor to iteratively provide the frame data as input to the third machine learning model to generate the second viseme data.

9. A non-transitory, processor-readable medium storing instructions that, when executed by a processor, cause the processor to:

receive text data;

provide the text data as input to a first machine learning model to determine an emotion state represented by the text data;

provide the text data and the emotion state as input to a second machine learning model to generate predicted viseme data;

generate audio data based on the text data and the emotion state, the audio data representing the text data and defining a clock;

cause (1) a first portion of the predicted viseme data and (2) a first portion of the audio data to be streamed to a user compute device based on the clock;

while the first portion of the predicted viseme data and the first portion of the audio data is being streamed to the user compute device, provide the audio data as input to a third machine learning model to generate audio-based viseme data; and in response to generating the audio-based viseme data:

cause (1) a portion of the audio-based viseme data and (2) a second portion of the audio data to be streamed to the user compute device based on the clock, and exclude a second portion of the predicted viseme data from being streamed to the user compute device, the portion of the audio-based viseme data, the second portion of the audio data, and the second portion of the predicted viseme data being associated with a time specified by the clock.

10. The non-transitory, processor-readable medium of claim 9, wherein:

the audio data includes a plurality of pulse-code modulation (PCM) frames.

11. The non-transitory, processor-readable medium of claim 9, wherein the instructions to cause the processor to determine the emotion state include instructions to cause the processor to:

provide the text data as input to the first machine learning model to identify a plurality of sentiments represented by the text data; and identify an inexact match between a first sentiment and a second sentiment, from the plurality of sentiments, to determine the emotion state.

12. The non-transitory, processor-readable medium of claim 9, further storing instructions to cause the processor to:

receive raw text data; and remove at least one of a code fence, a smart quote, a full-width punctuation, a trailing whitespace, a duplicative blank, or a control token, from the raw text data to produce the text data.

13. The non-transitory, processor-readable medium of claim 9, wherein the audio data represents a plurality of audio frames and crossfade frames interposed between the plurality of audio frames.

14. The non-transitory, processor-readable medium of claim 9, wherein the instructions to cause the processor to cause the first portion of the predicted viseme data and the first portion of the audio data to be streamed include instructions to cause the processor to:

cause the first portion of the predicted viseme data and the first portion of the audio data to be streamed to the user compute device via a Hypertext Transfer Protocol (HTTP) chunked transfer.

15. The non-transitory, processor-readable medium of claim 9, wherein:

the first machine learning model includes a large language model (LLM).

16. The non-transitory, processor-readable medium of claim 9, further storing instructions to cause the processor to:

cause an animation to be rendered at the user compute device based on the first portion of the predicted viseme data, while the instructions cause the processor to iteratively provide the audio data as input to the third machine learning model to generate the audio-based viseme data.

17. A method, comprising:

receiving, via a processor, text data;

predicting, via the processor, an emotion state based on the text data;

predicting, via the processor, predicted viseme data based on the text data and the emotion state;

iteratively generating, via the processor, audio data based on the text data and the emotion state, the audio data (1) representing the text data and defining a clock;

during the iteratively generating, storing, via the processor, a first portion of the audio data in a buffer;

in response to the first portion of the audio data stored in the buffer having at least a predefined length, causing, via the processor, (1) a first portion of the predicted viseme data and (2) the first portion of the audio data to be streamed to a user compute device based on the clock;

while the first portion of the predicted viseme data and the first portion of the audio data is being streamed to the user compute device, generating, via the processor, audio-based viseme data based on the audio data; and in response to generating the audio-based viseme data:

causing, via the processor, (1) a portion of the audio-based viseme data and (2) a second portion of the audio data to be streamed to the user compute device based on the clock, and excluding, via the processor, a second portion of the predicted viseme data from being streamed to the user compute device, the portion of the audio-based viseme data, the second portion of the audio data, and the second portion of the predicted viseme data being associated with a time specified by the clock.

18. The method of claim 17, wherein:

the audio data includes a plurality of pulse-code modulation (PCM) frames.

19. The method of claim 17, wherein the causing the first portion of the predicted viseme data and the first portion of the audio data to be streamed includes:

causing, via the processor, the first portion of the predicted viseme data and the first portion of the audio data to be streamed to the user compute device via a Hypertext Transfer Protocol (HTTP) chunked transfer.

20. The method of claim 17, further comprising:

causing, via the processor, an animation to be rendered at the user compute device based on the first portion of the predicted viseme data, during the generating the audio-based viseme data.

* * * * *